US009671509B2

(12) United States Patent
Sallas et al.

(10) Patent No.: US 9,671,509 B2
(45) Date of Patent: Jun. 6, 2017

(54) METHOD AND DEVICE FOR DETERMINING FREQUENCY SWEEP FOR SEISMIC SOURCE

(71) Applicant: CGG SERVICES SA, Massy (FR)

(72) Inventors: John Sallas, Plano, TX (US); Olivier Winter, Houston, TX (US)

(73) Assignee: CGG SERVICES SAS, Massy (FR)

( * ) Notice: Subject to any disclaimer, the term of this patent is extended or adjusted under 35 U.S.C. 154(b) by 600 days.

(21) Appl. No.: 14/082,503

(22) Filed: Nov. 18, 2013

(65) Prior Publication Data

US 2014/0169132 A1  Jun. 19, 2014

Related U.S. Application Data

(60) Provisional application No. 61/736,781, filed on Dec. 13, 2012.

(51) Int. Cl.
*G01V 1/38* (2006.01)
*G01V 1/00* (2006.01)

(52) U.S. Cl.
CPC .................... *G01V 1/005* (2013.01)

(58) Field of Classification Search
CPC . G01V 1/38; G01V 1/143; G01V 1/04; G01V 1/02; G01V 2210/16; G01V 2210/26; G01V 2210/127; G01V 1/005
See application file for complete search history.

(56) References Cited

U.S. PATENT DOCUMENTS

| 4,725,991 A * | 2/1988 | Crenwelge, Jr. .......... F42D 1/00 181/116 |
| 6,152,256 A | 11/2000 | Favret et al. |
| 7,327,633 B2 | 2/2008 | Bagaini et al. |
| 8,274,862 B2 | 9/2012 | Sallas |
| 2009/0076730 A1* | 3/2009 | Johnson ................. G01V 1/003 702/13 |
| 2011/0085416 A1* | 4/2011 | Sallas .................... G01V 1/005 367/38 |

OTHER PUBLICATIONS

D. Rappin et al., "Determination of safety distances and source monitoring during land seismic acquisition," Total Exploration and Production, Geophysical Operations and Technology, 2007 SEG Annual Meeting, Sep. 23-28, 2007 , San Antonio, Texas, pp. 41-45.

* cited by examiner

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

Controller and method for generating a frequency sweep for a seismic survey that uses a seismic source. The method includes receiving specification data about the seismic source; receiving environmental data about an infrastructure affected by the seismic survey; receiving guideline data about the infrastructure; setting a target energy spectrum density to be emitted by the seismic source during the seismic survey; and calculating, in a processor, the frequency sweep based on the specification data, environmental data, guideline data and the target energy spectrum density.

20 Claims, 12 Drawing Sheets

METHOD AND DEVICE FOR DETERMINING FREQUENCY SWEEP FOR SEISMIC SOURCE

CROSS REFERENCE TO RELATED APPLICATIONS

The present application claims the benefit of priority under 35 U.S.C. §119(e) to U.S. Provisional Application No. 61/736,781 filed on Dec. 13, 2012. The entire content of the above application is hereby incorporated by reference into the present application.

BACKGROUND

Technical Field

Embodiments of the subject matter disclosed herein generally relate to methods and systems and, more particularly, to mechanisms and techniques for generating a frequency sweep for a seismic source to be deployed next to a sensitive area.

Discussion of the Background

Reflection seismology is a method of geophysical exploration to determine the properties of a portion of a subsurface layer in the earth, which is information especially helpful in the oil and gas industry. Reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For land applications, sources are mainly vibratory, e.g., a baseplate is driven for a limited time with a desired frequency selected from a given frequency range for generating seismic waves that propagate through the earth. To cover the entire frequency range, a frequency sweep is applied by a controller to a seismic source, i.e., it sweeps the frequency range so that all frequencies in the range are applied to the baseplate. Vibratory sources may include hydraulically-powered sources or piezoelectric or magnetostrictive material.

Alternatively, impulsive sources may be used for generating the acoustic waves. An impulsive source may include explosive material that is detonated to create seismic waves.

A general problem associated with the use of seismic energy sources for land seismic surveys, vibratory or explosive, is that these sources generate ground motion which can damage nearby infrastructure, such as roads, buildings, pipelines, etc. Thus, various countries have imposed different regulations for limiting the level of ground motion that seismic sources are allowed to generate in the vicinity of infrastructures. For example, FIG. 1 illustrates some regulations used around the world in which ground motion is measured as a particle velocity on three mutually perpendicular components, usually the vertical, radial and transverse directions. A PPV (i.e., peak particle velocity) value is computed from particle velocity measurements. It is the PPV value that is typically capped as a function of frequency for different kinds of buildings and vibrations. The term PPV is defined as the peak particle velocity estimate that was computed using particle velocity measurements from one or more components. A suffix is added to term PPV if the measurement was made using only a single component, for example, PPV_vert is the vertical component, PPV_rad is the radial component. If it is a vector sum of component peak amplitudes, the term is PVS, (i.e. Peak Vector Sum).

The term CPPV (i.e., capped peak particle velocity) is used to represent the PPV threshold not to be exceeded and this threshold is set by the company conducting the seismic survey so that the company complies with local regulations. The term CPPV is herein used to apply to whatever motion threshold cannot be exceeded and can be based upon PVS, PPV_vert or a combination of component values to form a predetermined threshold not to be exceeded. Note that a company may choose to apply more restrictive CPPV values based on external recommendations to ensure no damage is inflicted on any neighboring infrastructure than what a governmental agency might specify.

Thus, the company performing the seismic survey may install sensors around infrastructures in or close to the seismic survey and monitor the data these sensors record to ensure they are compliant with local regulations.

Additionally, the company performing the seismic survey may choose to enforce buffer zones according to minimum safety distances established in the industry, such as those published by the International Association of Geophysical Contractors. However, safety buffers reduce the quality of acquired seismic data by reducing the fold of coverage. An additional common practice is to enforce low-drive buffer zones to reduce the force of the vibration. This allows recording seismic data over a larger area thereby helping to preserve adequate spatial sampling, but at the expense of a lower signal-to-noise ratio due to the lower signal amplitude.

Various solutions have been proposed over time to prevent recorded seismic data degradation while preserving the integrity of the seismic survey area's infrastructure.

Rappin et al. ("Determination of safety distances and source monitoring during land seismic acquisition," Chapter 8, Pages 41-45) proposes a two-step method to adjust safety distances. First, a PPV versus offset is measured on the seismic site. Then, the PPV versus offset curve is fitted and interpolated. Second, a safety distance is deduced from this curve, matching the enforced CPPV, (i.e. PPV threshold), with a safety margin. An optional recommended third step is to monitor each structure presenting a risk during the seismic acquisition.

Favret and Genaud (U.S. Pat. No. 6,152,256, the entire content of which is included herein by reference), proposes to modulate the force of the vibration as a function of frequency to match a PPV versus frequency curve. The curve can be empirical or theoretical. Compared to the low-drive buffer zone approach, this approach allows preservation of frequencies that do not threaten structures. However, this and other existing methods do not maintain the original target power spectral density, and, thus, generate noisier seismic data in sensitive areas.

All these traditional approaches are still limited in the sense that the full potential of the seismic source is not tapped for fear of damaging existing structures. Therefore, there is a need for a method that can adjust a seismic source force as a function of frequency to take into account the CPPV but also to modulate the source sweep rate to maintain the emitted spectral density for vibrator source points swept in sensitive areas. Note that the instantaneous sweep rate is the time derivative of the sweep frequency versus time function.

SUMMARY

According to one embodiment, there is a method for generating a frequency sweep for a seismic survey that uses a seismic source. The method includes receiving specification data about the seismic source; receiving environmental data about an infrastructure affected by the seismic survey; receiving guideline data about the infrastructure; setting a target energy spectrum density to be emitted by the seismic source during the seismic survey; and calculating, in a processor, the frequency sweep based on the specification data, environmental data, guideline data and the target energy spectrum density.

According to another embodiment, there is a method for generating a frequency sweep for a seismic survey that uses a vibratory seismic source. The method includes receiving specification data about the vibratory seismic source; receiving measurement data about an infrastructure exposed to the seismic survey, wherein the measurement data is achieved with an applied force smaller than a maximum force of the vibratory seismic source; scaling up the measurement data based on a ratio of the applied force and the maximum force to determine a frequency range for which the vibratory seismic source exceeds guideline data concerning the infrastructure; setting a target spectrum to be emitted by the vibratory seismic source during the seismic survey; and calculating, in a processor, the frequency sweep based on the specification data, the frequency range, the guideline data and the target spectrum.

According to yet another embodiment, there is a method for driving a seismic source during a seismic survey. The method includes calculating, in a processor, a frequency sweep based on specification data related to the seismic source, environmental data related to an infrastructure affected by the seismic survey, guideline data that limits seismic energy to be applied to the infrastructure, and target spectrum to be emitted by the seismic source; and applying the frequency sweep to the seismic source when an offset between the seismic source and the infrastructure matches an actual offset.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
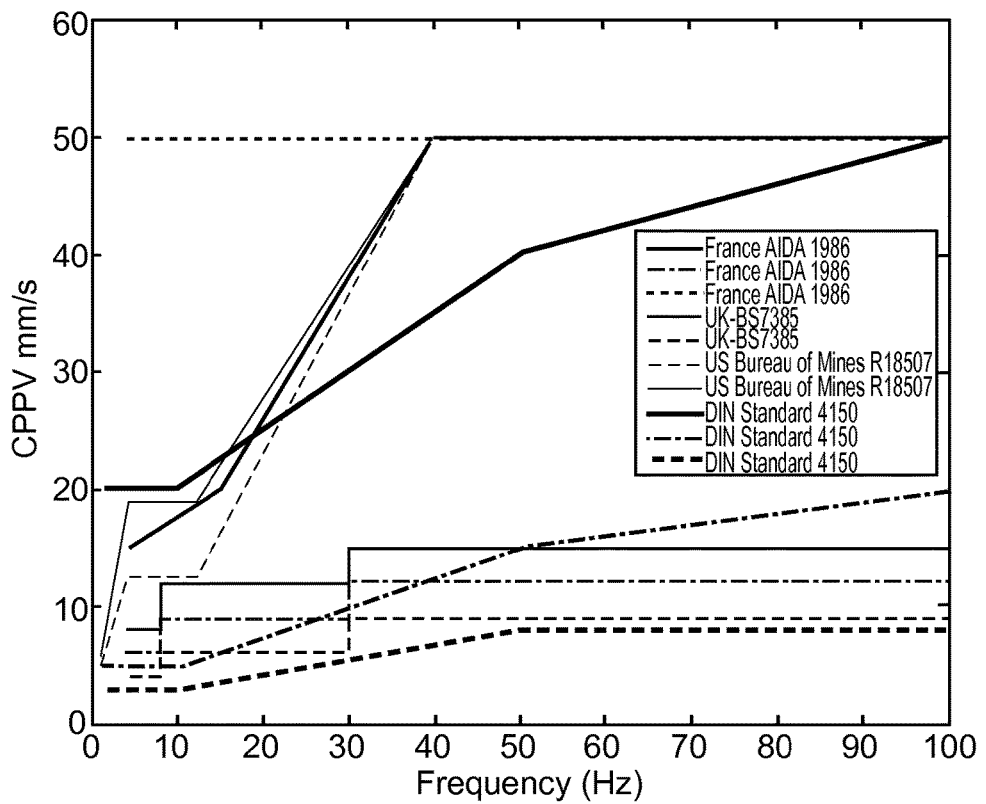
FIG. 1 is a vibratory graph of various CPPV standards.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a vibratory seismic source to be used on land. However, the novel embodiments discussed below may also be applicable to a marine source or another kind of seismic source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for determining a frequency sweep for a seismic source that takes into account not only various constraints (e.g., electrical or mechanical) of the seismic source, but also environmental constraints. In one application, a force amplitude and frequency dwell time for the seismic source are adjusted based upon PPV thresholds. In another application, these adjustments are performed for each frequency applied during the seismic survey. In still another application, a library of frequency sweeps having various force amplitudes and frequency dwell times is generated, and the seismic source is configured to dynamically apply one or more frequency sweeps from the library, depending on the type of infrastructure and/or distance to infrastructure while performing the seismic survey.

For example, if the seismic source is vibratory, with an electro-magnetic actuator driven by a driving mechanism that includes an amplifier, the method identifies physical properties of both the actuator and the amplifier that may limit the ability of the vibratory source to provide the expected output, such as the source element stroke limit (e.g., actuator stroke limit), the source element velocity limit, the amplifier current limit, and the amplifier voltage limit. If the seismic source uses a pump to activate the baseplate, a flow of the fluid through the pump may be a mechanical limitation of the seismic source. Identification of an additional constraint, i.e., the environmental constraint (e.g., CPPV) introduced by land surface guidelines (which may be one or more of government regulations, recommendations, internal procedures, etc.), may also be taken into account by this novel method, which determines a frequency sweep that may be modulated both in frequency and amplitude. The frequency sweep is configured to achieve a target output spectrum with maximum energy output while complying with multiple constraints. Various target output spectrums may be considered. However, for simplicity, the following embodiments discuss a flat target output spectrum.

In one embodiment, PPV measurements (measured profile) are made at one or more offsets (i.e., dozens of meters) from structures of concern. These structures may include dwellings, bridges, buried pipes, churches, etc. These measurements may be made using a linear sweep (any sweep may be used) at low drive signals and a moderate sweep rate. The low drive signals may be, when expressed as a percentage, between 10% and 40% of the originally-designed drive signal. The reason for using low drive signals when performing PPV measurements is to make sure no damage is inflicted on structures of concern. A percentage outside the range of 10% to 40% may be used for initial PPV measurements, depending on the specific survey and local regulations.

After receiving a predetermined maximum PPV level versus frequency profile (reference profile), e.g., according to regulations of the specific country or an even more conservative profile generated by the surveying company based on prior experience, the measured profile is compared against the reference profile. Some safety margin may be added to the measured profile. A ratio between the reference profile and the measured profile provides an estimate of how much harder the seismic source can shake at any given frequency for a given offset. The derived force amplitude can then be incorporated as a constraint into a sweep generator along with a desired signal target spectrum. The instantaneous sweep rate is adjusted to compensate for the amplitude constraint. A suite of sweeps may be generated for different offsets and/or different structures. The source operator can select which particular sweep to use as the source approaches the respective structure.

Figure 2:
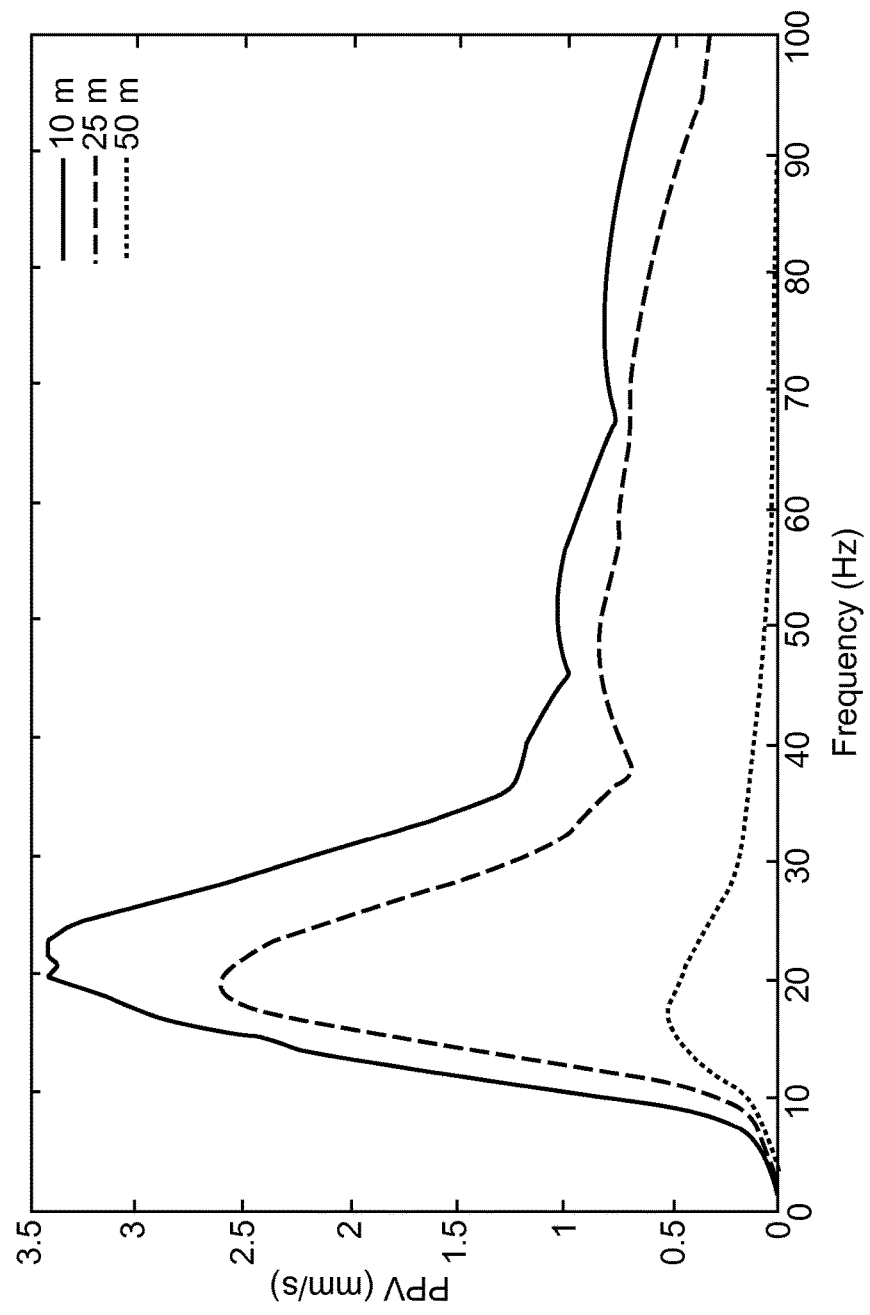
FIG. 2 is a vibratory graph of calculated PPV versus frequency using measured data for three different source offsets.

The above-noted methods are now discussed in more detail. FIG. 2 shows the results of a test measuring PPV versus frequency for a vibrator operated at a low drive level setting (low ground force setting) collected for three different offsets, 10, 25 and 50 m. The PPV is defined as being: max{abs(Vz), abs(Vx), abs(Vy)}, where Vz, Vx and Vy are three components of the particle velocity. In one application, another quantity may be used instead of PPV, for example, the PVS, i.e., the peak vector sum defined as: max $\sqrt{V_x^2+V_y^2+V_z^2}$. For simplicity, the term PPV in this application is used to represent any of the aforementioned measurements or any combination of these terms or any other type of environmental vibration constraint that may be deemed appropriate for a candidate survey area, e.g., vertical PPV, radial PPV, transverse PPV, combinations of vertical, radial, and transverse PPV, vector sum PVS, etc. Note that CPPV represents the threshold value of PPV not to be exceeded.

The data illustrated in FIG. 2 is collected by placing sensors, for example, geophones, accelerometers or other particle motion sensors, above ground or buried in the ground and positioning a seismic source and driving it at the indicated offsets. The seismic source is one that may be used during the seismic survey. Note that some PPV measurements are typically taking place prior to starting the seismic survey although the most common application is continuous monitoring during the seismic survey. Also note that each curve shown in FIG. 2 corresponds to a single sensor. Thus, it is possible to have many such curves if plural sensors are used for PPV measurement. Also note that the sensor measures PPV versus time, and the measured data is then processed to be plotted versus frequency as illustrated in FIG. 2.

Figure 3:
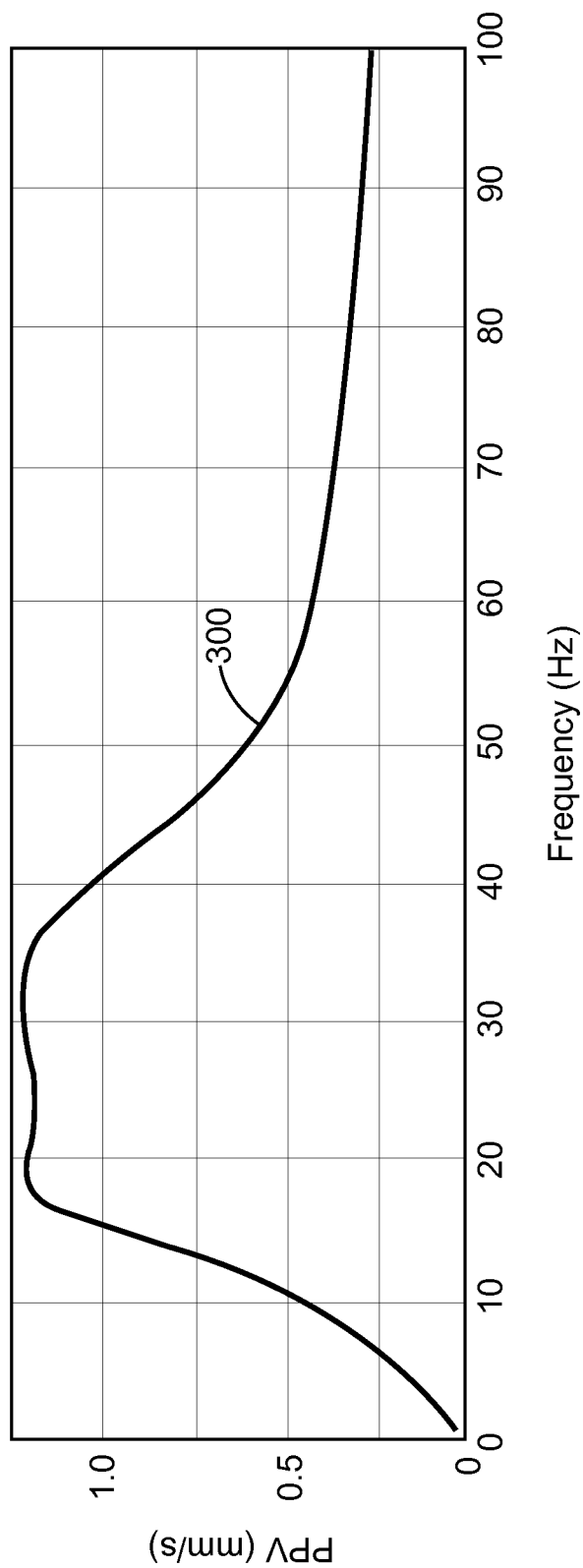
FIG. 3 is a calculated PPV versus frequency graph for a single source offset point.

FIG. 3 illustrates one PPV versus frequency curve 300 for a typical offset to a structure anticipated to be used in an upcoming survey. Curve 300 is not one of those shown in FIG. 2. The PPV values on curve 300 have been measured with, for example, 50 m offset using a drive level setting (of approximately 25%) corresponding to a force output of 69.5 kN on a vibrator (seismic source) with a maximum force rating of 278 kN.

Figure 4:
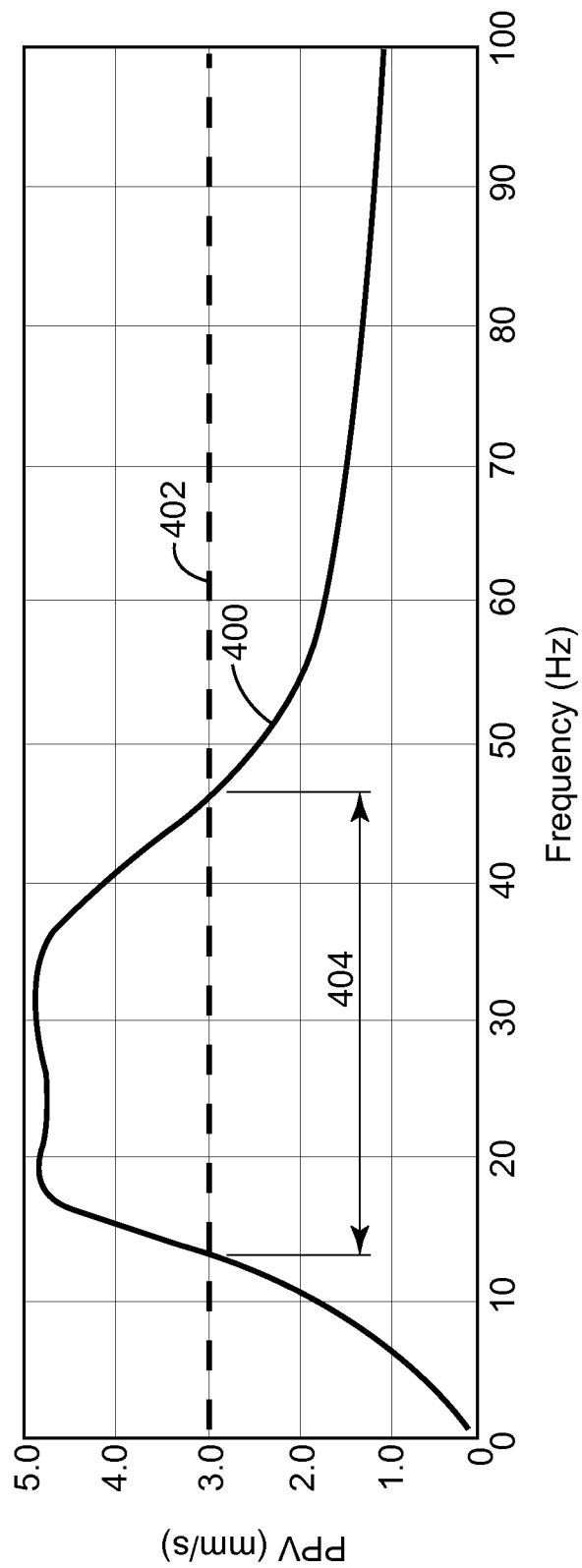
FIG. 4 is a PPV versus frequency estimate for a vibrator operating at maximum drive level.

If the PPV values of curve 300 in FIG. 3 are taken to form an estimate of the PPV that might result if the vibrator were operated at full output (i.e., 100%), FIG. 4 shows this estimate as curve 400. The PPV estimate curve 400 is considered to be at the same offset of 50 m. FIG. 4 shows the predicted PPV levels versus frequency as curve 400. Note that curve 300 was linearly scaled by a factor of about 4, which is equal to the ratio of the maximum force of 278 kN applied for FIG. 4 and the force of 69.5 kN applied for FIG. 3. Because the vibration energy imparted by a seismic source is relatively low, experience has shown that the soil/earth behave linearly. So, for example, if the force applied is doubled, PPV will double. This is why curve 300 is scaled to curve 400 in FIG. 4. However, if a more accurate model is used instead of this linear scaling, the novel features discussed herein are still applicable.

Now consider that for this particular environment in which the seismic survey is to be performed, the maximum allowed PPV, (i.e., CPPV) is 3 mm/s (represented as a dashed curve 402 in FIG. 4). Curve 402 may be, in this case, a value selected by the company to be lower than governmental regulations require. Note that a constant CPPV of 3 mm/s is selected in this example for simplicity. In fact, CPPV curve 402 may have any shape. It can be seen in FIG. 4 that over the frequency range 404, of about 12-48 Hz, if the vibrator were operated at maximum drive level (278 kN), the CPPV value 402 will be exceeded. In other words, the estimated PPV value over the frequency range 404 is about 5 mm/s. Thus, in order to stay below the CPPV allowed level 402, the force level setting needs to be scaled by at least a factor of 0.6=(3 mm/s)/(5 mm/s). In one application, to ensure a safety margin, a force setting corresponding to 55% of the maximum force level, or 153 kN, is considered when the vibrator operates in region 404.

Note this is a simple example because curve 400 is fairly flat throughout range 404; if there were more variation or curvature in region 404, the force setting profile might vary with frequency throughout range 404, thus, being curved or sloped instead of being a constant value.

Having the constraint (curve 402) imposed by the CPPV, next a frequency sweep is generated for the seismic source. A sophisticated sweep design method is disclosed in U.S. patent application Ser. No. 12/576,804, entitled, "System and method for determining a frequency sweep for seismic analysis," the entire content of which is incorporated herein by reference. This method may be adapted to design a sweep frequency that takes into consideration the CPPV is now discussed.

Figure 5:
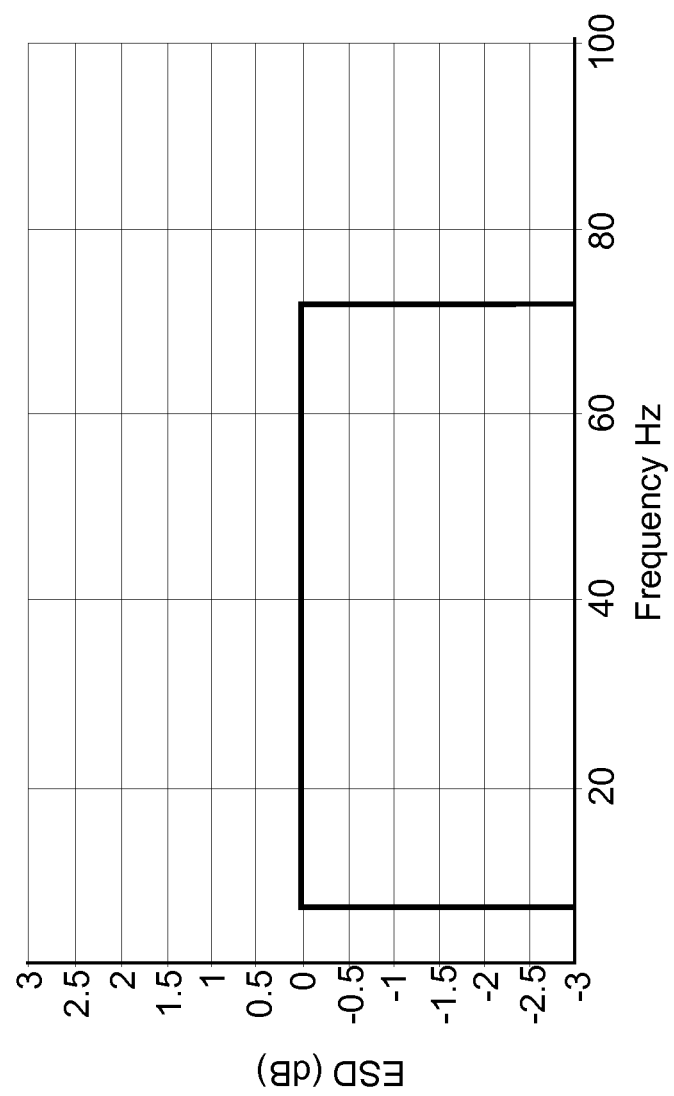
FIG. 5 is a normalized output energy target spectrum.

For a given vibratory source, it is desired to determine the frequency sweep so that a target spectrum is obtained, e.g., an energy spectral density (ESD) objective or a target energy spectral density shape. The ESD is proportional to the square of the amplitude spectrum and a factor that is a function of the sweep length, and thus, knowing the sweep length to be used, an ESD can be computed from an amplitude spectrum and vice versa. There are various possible shapes for the desired ESD, depending on the nature of the survey, the intended features to be revealed, etc. For example, a band-limited force amplitude spectrum that is flat over the frequency range of 4-72 Hz, like that illustrated in FIG. 5, may be the desired target force amplitude spectrum. A flat amplitude spectrum has the advantage that it increases the resolution of the final image for most of the frequencies in the frequency band. However, note that the ESD or target amplitude spectrum may have, for example, a sinus shape or other non-regular shapes. Note that FIG. 5 has a rectangular shape with an abrupt drop to zero energy outside of the sweep pass band; in practice, it may be desirable to have the target spectrum taper down to zero to avoid spectral corners that can create artifacts. Also, in practice, there is usually some form of amplitude taper at the beginning and end of the sweep to allow time for hydraulic pumps to come on stroke or to avoid output spikes due to discontinuities if the sweep is started or stopped abruptly.

Each seismic source has its own limitations. A set of limitations specific to a hydraulic vibratory source having a servomechanism that activates a reaction mass for applying a desired force on the baseplate are now discussed. For other types of seismic sources, additional or different limitations may be considered.

One limitation of the reaction mass is its stroke at small frequencies, as identified in U.S. Pat. No. 7,327,633, the entire content of which is incorporated herein by reference. Another limitation is the pump flow (or "fluid flow") of the hydraulic vibratory source as identified in U.S. Pat. No. 8,274,862, the entire content of which is incorporated herein by reference. For most vibrators in use today, pumps are incapable of delivering adequate flow for long-dwell-low-frequency linear sweeps, even at reduced drive levels.

Figure 6:
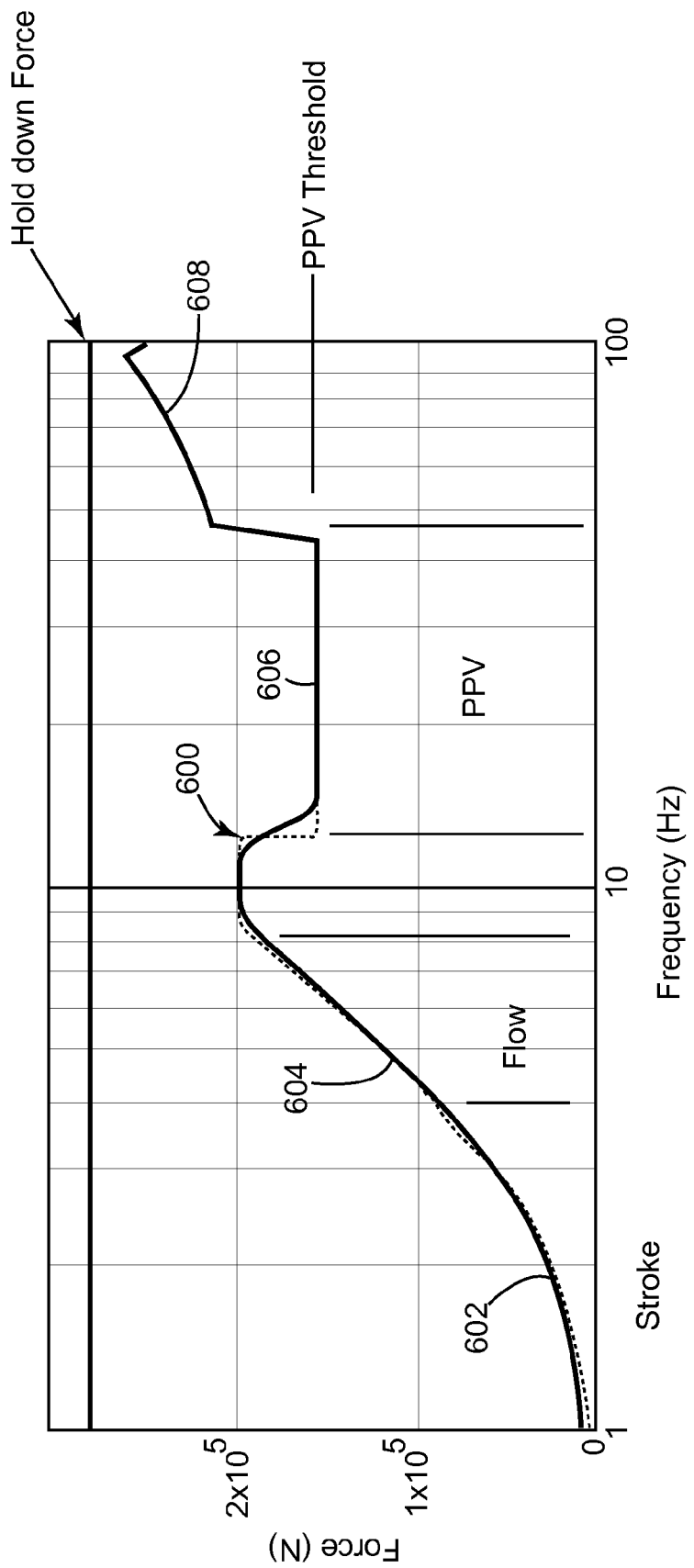
FIG. 6 is a force amplitude versus frequency constraint graph.

The flow and displacement constraints may be combined with the CPPV constraint illustrated in FIG. 4 to determine the maximum peak fundamental force a given hydraulic seismic vibrator device might be able to sustain under those constraints. FIG. 6 shows a resulting force curve 600 that arises for an exemplary seismic vibrator when determining the maximum peak fundamental force under the flow, displacement and CPPV constraints. The parabolic-shaped portion 602 represents the maximum force that can be realized due to a displacement limit. In this case, this displacement limit provides only an overriding constraint to output force from the range of zero to 4 Hz. For frequencies above 4 Hz, the displacement limit is no longer the dominating factor. The force output on portion 604 may be constrained by pump flow over the range of 4 Hz to 8 Hz. As the source advances to higher frequencies, between 12 and 40 Hz, the overriding limiting factor is the CPPV as illustrated by portion 606. Beyond 40 Hz, portion 608 of curve 600 is limited only by the user-selected maximum force output to be employed in the sweep.

Having now all the ingredients necessary for generating the frequency sweep, i.e., the physical constraints of the vibratory source, the target spectrum, and the CPPV, a frequency sweep that can be applied to the source without exceeding the CPPV can be determined. A control device (to be discussed later) is configured to take as input the physical constraints of the vibratory source element, the target spectrum, and the CPPV for calculating and outputting the frequency sweep.

Curve 600 in FIG. 6 illustrates the equipment's force constraint curve used in designing EmphaSeis sweeps, assuming a maximum force setting of 70% of hold-down (about 200 kN). That is plotted on a semi-log scale modified to include a CPPV constraint covering the frequency range of about 12-48 Hz. To avoid issues with abrupt changes in frequency that can produce artifacts in the data to be acquired, the force frequency constraint curve 600 has been smoothed to remove sharp corners. For frequencies that fall below range 404 (see FIG. 4), equipment specifications impose constraints on force output: actuator stroke (reaction mass peak to peak travel), and hydraulic pump flow ratings. Optionally, as the seismic source applies frequencies greater than those of range 404, it is possible to elect to have the force constraint rise up from 55% (CPPV level) to 90% of its force rating at 100 Hz. This actually exceeds the ordinary maximum force setting of 70% of hold-down. The slope of this high frequency force transition is exaggerated, since the frequency axis is displayed on a log scale. The 70% of hold-down is usually followed to help reduce harmonic artifacts in the data set. The used sweep would eventually only cover the range of 4-72 Hz. Thus, any harmonic distortion produced by operation outside range 404 it is of little consequence because, during the processing stage, this part will be filtered off. The drive signal level may be increased at the higher frequencies to help reduce overall sweep length and to reduce the amount of time spent at these higher audible frequencies that may be annoying to nearby residents.

Figure 7:
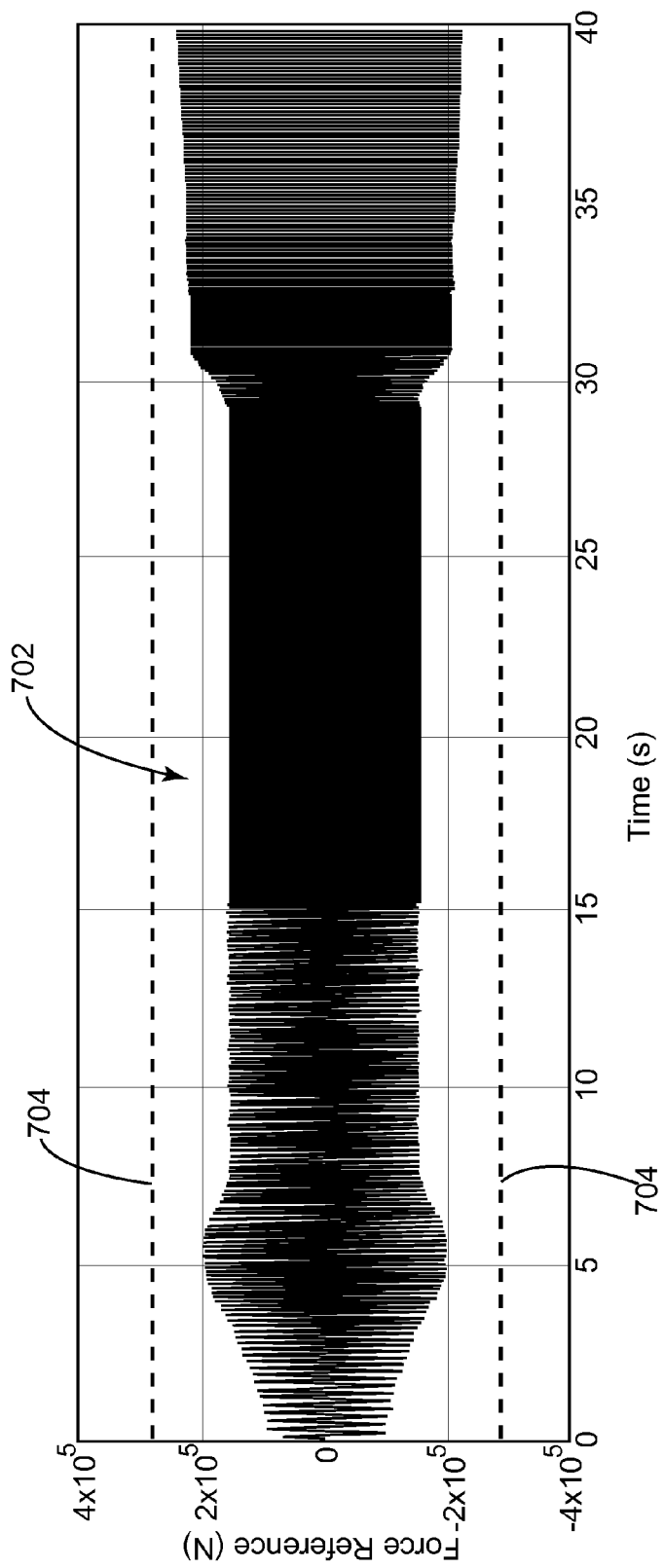
FIG. 7 is the tailored sweep force reference signal versus time.
Figure 8:
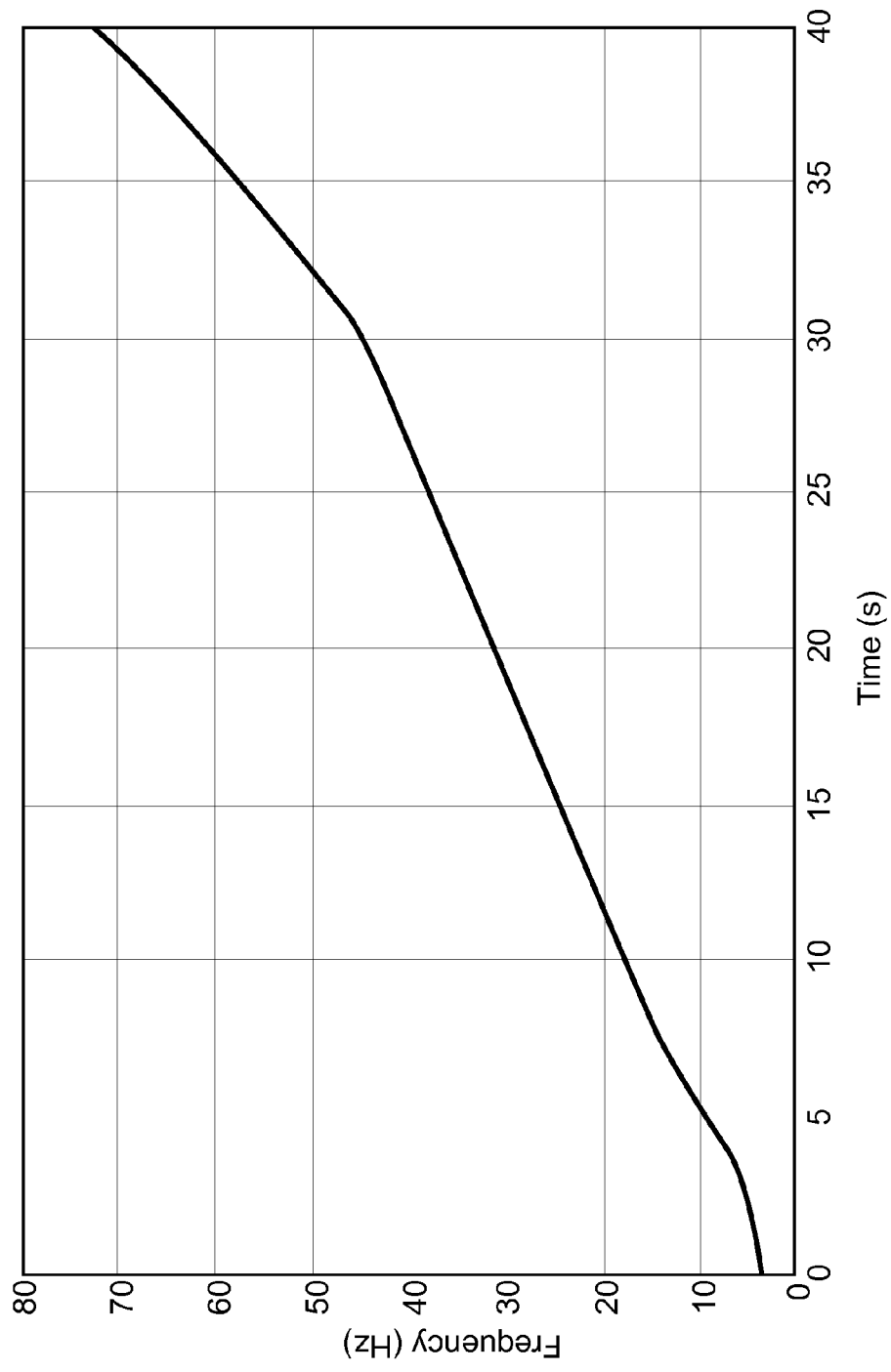
FIG. 8 is the instantaneous sweep frequency versus time profile for the tailored sweep pilot signal.

As a result of these calculations, a sweep envelope 702 (i.e., a graph of force versus time) for the seismic source having optimized sweep that takes CPPV thresholds into account is obtained and has a shape as illustrated in FIG. 7. Lines 704 indicate the rated maximum peak to peak force levels for this vibrator model. Note the reduced force magnitude in the frequency range of 12 to 40 Hz due to the CPPV constraint. The sweep shown in FIG. 7 also has a short amplitude taper at the start and end of the sweep to avoid discontinuities in the desired force signal that might create unwanted noise spikes. The instantaneous sweep frequency versus time is illustrated in FIG. 8, and the instantaneous sweep rate (i.e., the slope of the curve shown in FIG. 8) is also calculated by the control device based on the above-noted constraints.

All these calculations may be performed prior to starting the seismic survey or during the seismic survey or both based either on the PPV measurements discussed above or based on simulated PPV measurements. Simulated measurements may be performed in a field different from the actual field in which the seismic survey is going to be performed. Especially when the earth composition in the area to be surveyed has no unusual geological structures, actual measurements may take place in an experimental field. A source and a sensor are placed in the experimental field and various low level forces are applied to the source for a given frequency range. By knowing the geometry of this setup, it is possible to generate (estimate based on calculations) PPV thresholds for any area to be surveyed based on the measurements collected in the experimental field instead of deploying a source and receiver in the actual field. Preferably, a test to determine force level constraints should be conducted at the site to be surveyed. However, in some circumstances, it is possible that a test is conducted instead in an area near or adjacent to the property to be surveyed to provide these estimates.

Figure 9:
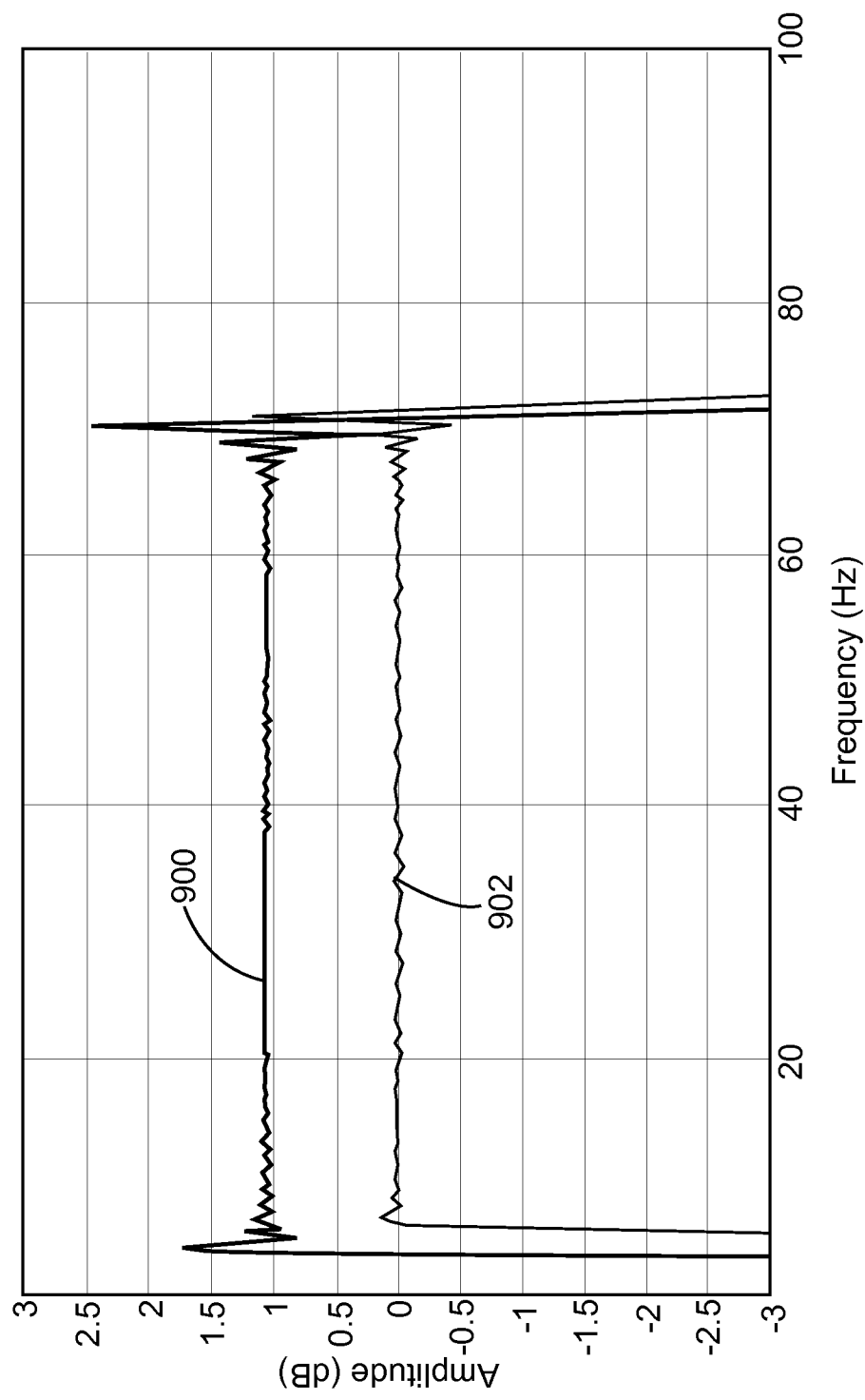
FIG. 9 is a comparison of the amplitude spectrum for a tailored sweep versus a conventional sweep.

FIG. 9 compares a tailored sweep 900 calculated as discussed above with a conventional reduced drive linear sweep 902 that is empirically calculated. The curves in FIG. 9 are ESD plots that were normalized to the frequency midpoint value of the conventional linear sweep 902 for easier comparison. Note that the tailored sweep 900 has 1 dB gain in amplitude for the same frequency range, which means that more energy is injected into the earth while still complying with CPPV. This indicates that the seismic data collected when the tailored sweep is used has a higher signal-to-noise ratio than the traditional seismic data, which generates a more accurate image of the subsurface.

Figure 10:
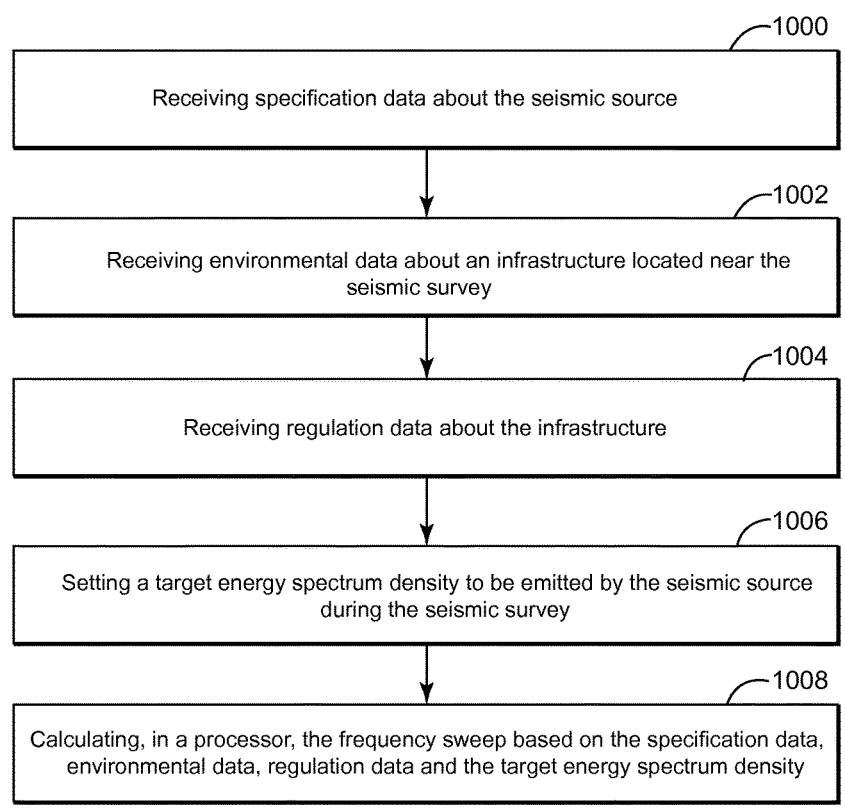
FIG. 10 is a flowchart illustrating the tailored sweep design/implementation process.

A method for generating a frequency sweep for a seismic survey that uses a seismic source is now discussed with regard to FIG. 10. The method includes a step 1000 of receiving specification data about the seismic source; a step 1002 of receiving environmental data about an infrastructure located near the seismic survey; a step 1004 of receiving regulation data about the infrastructure; a step 1006 of setting a target energy spectrum density to be emitted by the seismic source during the seismic survey; and a step 1008 of calculating, in a processor, the frequency sweep based on the specification data, environmental data, regulation data and the target energy spectrum density.

Note that this method may be implemented for a single vibratory source but also for a source array that includes plural single vibratory sources. For example, it is possible to use a source array, in a producing oil field where pipes need to be protected, and use a conservative estimate that assumes that two vibrators acting together at a given force level produce about the same PPV as one vibrator operating at twice the given force level, assuming that array directivity effects are neglected.

A method for driving a seismic source during a seismic survey may include a step of calculating, in a processor, a frequency sweep based on specification data related to the seismic source, environmental data related to an infrastructure affected by the seismic survey, regulation data that limits seismic energy to be applied to the infrastructure, and target energy spectrum density to be emitted by the seismic source; and a step of applying the frequency sweep to the seismic source when an offset between the seismic source and the infrastructure matches a pre-determined offset.

Figure 11:
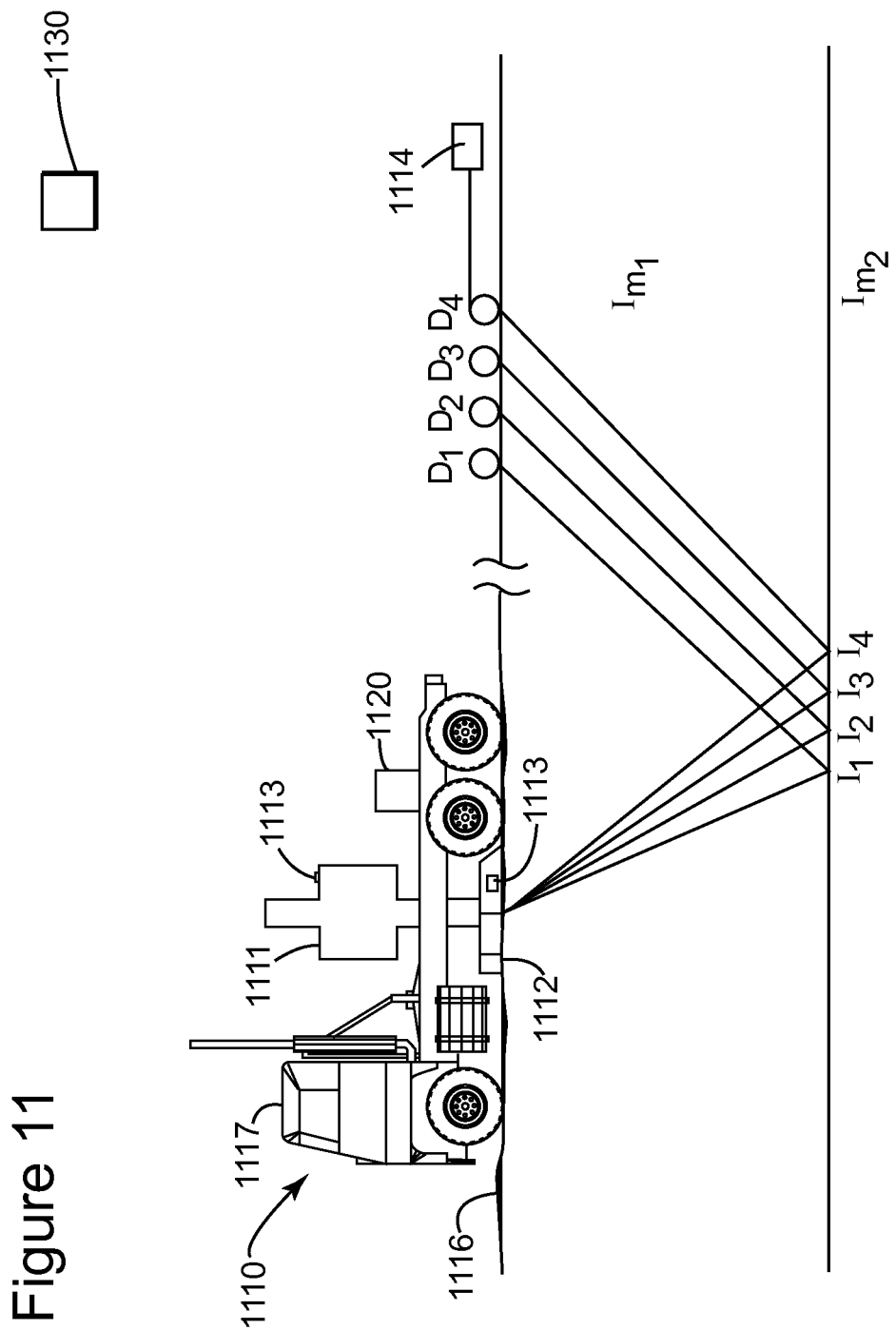
FIG. 11 is a schematic of a seismic survey data acquisition system.

An example of a seismic vibrator is now discussed with regard to FIG. 11. FIG. 11 illustrates, in a simplified manner, the typical elements of a vibroseis acquisition system such as may be used for producing an output spectrum according to a frequency sweep created by a sweep generator in accordance with embodiments of the present invention. In the illustrated system, a seismic vibrator 1110 includes a vibrating element, i.e., a reaction mass with a central bore that contains a piston to form a hydraulic actuator 1111, a baseplate 1112, and a signal measuring apparatus 1113 (which is shown in this example as measuring signals from two sensors, one on the reaction mass and one on the baseplate). As one example, signal measuring apparatus 1113 may include a plurality of accelerometers whose signals are combined to measure the actual ground-force signal applied to the earth by the seismic vibrator. Seismic vibrator 1110 is constructed on a truck 1117 that provides system maneuverability. As illustrated in the example of FIG. 11, hydraulic actuator 1111 is coupled with baseplate 1112 to provide for transmission of vibrations from the hydraulic actuator 1111 to baseplate 1112. Baseplate 1112 is in contact with an earth surface 1116.

The seismic signal generated by actuator 1111 (as a consequence of the frequency sweep generated as discussed in the above embodiments) and emitted into the earth via baseplate 1112 may be reflected off the interface between subsurface impedances $I_{m1}$ and $I_{m2}$ at points $I_1$, $I_2$, $I_3$, and $I_4$. This reflected signal is detected by receivers, such as geophones D1, D2, D3 and D4, respectively. The signals generated by actuator 1111 and baseplate 1112 are also converted to a suitable data format and then transmitted to data storage 1114 for combination with raw seismic data received from geophones D1, D2, D3 and D4 to provide for processing of the raw seismic data. In operation, a drive signal that is an output of the vibrator control electronics causes actuator 1111 to exert a variable force on baseplate 1112. The vibrator control electronics adjust the drive signal so the ground force output of the vibrator matches the reference signal as closely as system dynamics allow. In most cases, seismic data received from geophones D1, D2, D3 and D4 is correlated with the reference signal so the resulting correlated data approximates data that would have been recorded if the source had been impulsive energy.

Figure 12:
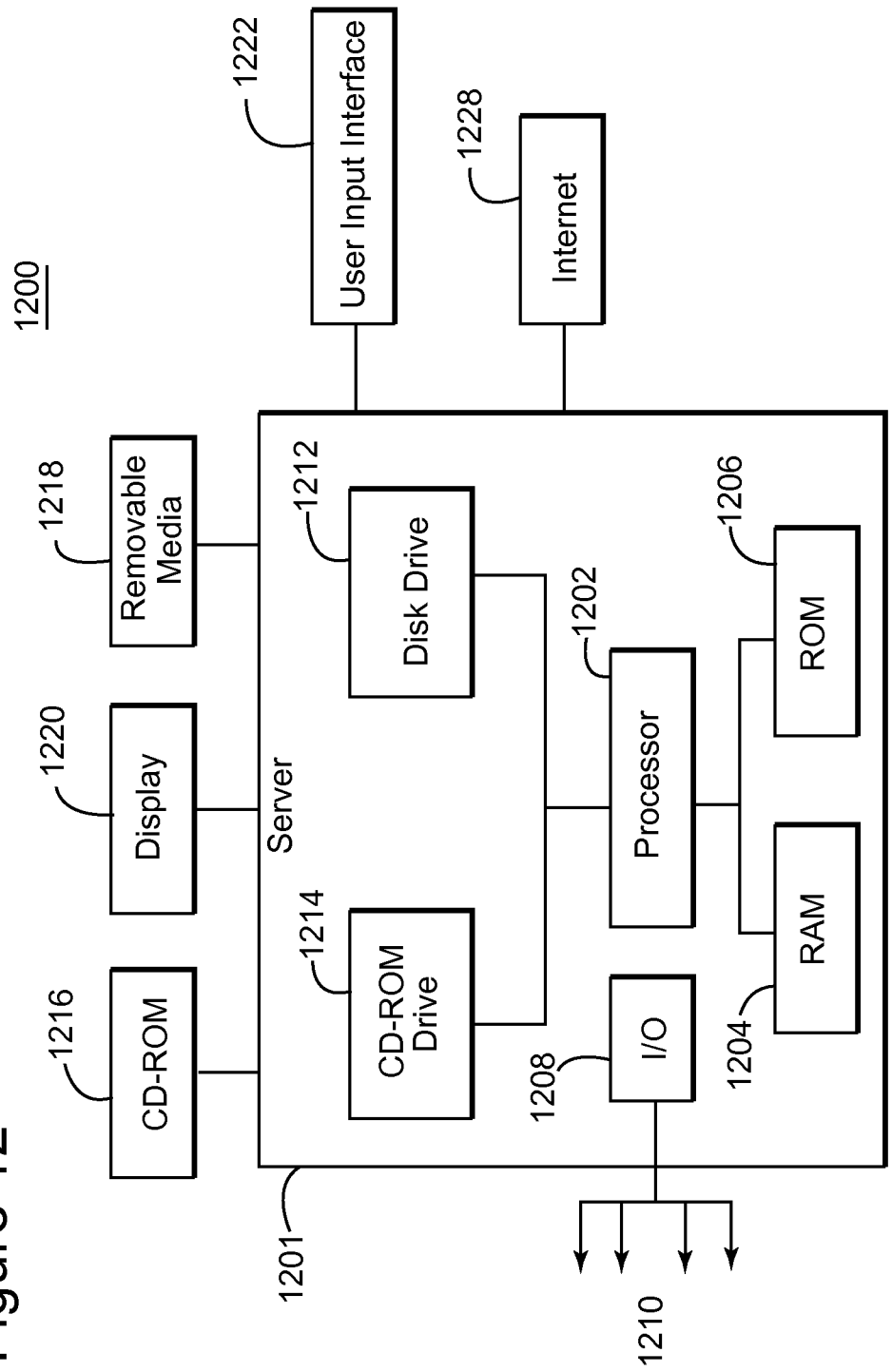
FIG. 12 is a schematic diagram of a controller according to an exemplary embodiment.

A local control device 1120 located on truck 1117 may receive the frequency sweep discussed with regard to FIG. 7 and drive the seismic source accordingly. A central control device 1130, located either in the field or at a facility of the company performing the seismic survey, is configured to calculate the frequency sweep based on various specifications of the seismic source and environmental constraints (e.g., CPPV) imposed in the area in which the seismic survey is to be performed. A possible structure of such a control device is discussed with regard to FIG. 12.

An example of a representative control system capable of carrying out operations in accordance with the exemplary embodiments discussed above is illustrated in FIG. 12. Hardware, firmware, software or a combination thereof may be used to perform the various steps and operations described herein.

The exemplary control system 1200 suitable for performing the activities described in the exemplary embodiments may include server 1201. Such a server 1201 may include a central processor unit (CPU) 1202 coupled to a random access memory (RAM) 1204 and/or to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. For example, processor 1202 may communicate with the seismic receivers, or the vibrator control electronics 1120. Processor 1202 carries out a variety of functions as are known in the art, as dictated by software and/or firmware instructions.

Server 1201 may also include one or more data storage devices, including hard disk drives 1212, CD-ROM drives 1214, and other hardware capable of reading and/or storing information such as a DVD, etc. In one embodiment, software for carrying out the above-discussed steps may be stored and distributed on a CD-ROM 1216, removable media 1218, or other form of media capable of portably storing information. These storage media may be inserted into, and read by, devices such as CD-ROM drive 1214, disk drive 1212, etc. Server 1201 may be coupled to a display 1220, which may be any type of known display or presentation screen, such as LCD, plasma displays, cathode ray tubes (CRTs), etc. A user input interface 1222 is provided, including one or more user interface mechanisms such as a mouse, keyboard, microphone, touch pad, touch screen, voice-recognition system, etc.

Server 1201 may be coupled to other computing devices, such as the equipment of a vessel, another seismic source, etc. via a network. The server may be part of a larger network configuration as in a global area network (GAN) such as the Internet 1228, which allows ultimate connection to various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

The disclosed exemplary embodiments provide a source array, computer software and a method for generating a frequency sweep for vibrational sources (marine or land). It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating a frequency sweep for a seismic survey that uses a seismic source, the method comprising:
    receiving specification data about the seismic source;
    receiving environmental data which includes measurements indicative of ground motion affecting an infrastructure, the ground motion being generated during the seismic survey by the seismic source;
    receiving guideline data about the infrastructure, wherein the guideline data limits seismic energy to be applied to the infrastructure;
    setting a target energy spectrum density to be emitted by the seismic source during the seismic survey, wherein the target energy spectrum density is proportional with a square of an amplitude spectrum of the frequency sweep;
    calculating, in a processor, the frequency sweep based on the specification data, environmental data, guideline data and the target energy spectrum density; and
    applying the frequency sweep to the seismic source.

2. The method of claim 1, wherein the environmental data includes measured particle motions at one or more locations around the infrastructure.

3. The method of claim 2, wherein the guideline data includes admissible cap particle peak velocities (PPV).

4. The method of claim 3, wherein the step of calculating comprises:
    transforming the measured time domain particle motions into measured PPV versus frequency;
    calculating a ratio of the maximum force of the seismic source and a force applied to achieve the measured PPV versus frequency; and
    scaling up the measured PPV versus frequency with the ratio.

5. The method of claim 4, further comprising:
    comparing the scaled up measured PPV versus frequency with the admissible cap PPV; and
    identifying one or more frequency ranges for which the seismic source exceeds the admissible cap PPV.

6. The method of claim 5, further comprising:
    for the one or more frequency ranges, constraining the applied force based on the admissible cap PPV.

7. The method of claim 6, further comprising:
    for other frequencies, constraining the applied force based on the specification data.

8. The method of claim 7, wherein the specification data includes a stroke constraint and a flow constraint.

9. The method of claim 1, wherein the seismic source is a vibratory land source having a servo-valve.

10. The method of claim 4, wherein the measuring of particle motions versus time is achieved with the seismic source driven at a percentage of its maximum force.

11. The method of claim 10, wherein the percentage is between 10% and 40%.

12. The method of claim 1, wherein the step of calculating comprises:
    calculating a suite of frequency sweeps for various offsets between the seismic source and the infrastructure.

13. The method of claim 1, wherein the step of calculating comprises:
    calculating a suite of frequency sweeps for various types of infrastructure.

14. A method for generating a frequency sweep for a seismic survey that uses a vibratory seismic source, the method comprising:
    receiving specification data about the vibratory seismic source;
    receiving measurement data about an infrastructure exposed to the seismic survey, wherein the measurement data is achieved with an applied force smaller than a maximum force of the vibratory seismic source;
    scaling up the measurement data based on a ratio of the applied force and the maximum force to determine a frequency range for which the vibratory seismic source exceeds guideline data concerning the infrastructure;
    setting a target spectrum to be emitted by the vibratory seismic source during the seismic survey;
    calculating, in a processor, the frequency sweep based on the specification data, the frequency range, the guideline data and the target spectrum; and
    applying the frequency sweep to the seismic source.

15. The method of claim 14, wherein the measurement data includes measured particle motions versus time at one or more locations around the infrastructure.

16. The method of claim 15, wherein the guideline data includes admissible PV thresholds.

17. The method of claim 14, wherein the step of calculating comprises:
    calculating a suite of frequency sweeps for various offsets between the seismic source and the infrastructure.

18. The method of claim 14, wherein the step of calculating comprises:
    calculating a suite of frequency sweeps for various types of infrastructure.

19. A method for driving a seismic source during a seismic survey, the method comprising:
    calculating, in a processor, a frequency sweep based on specification data related to the seismic source, environmental data related to an infrastructure affected by the seismic survey, guideline data that limits seismic energy to be applied to the infrastructure, and target energy spectrum density to be emitted by the seismic source, wherein the target energy spectrum density is proportional with a square of an amplitude spectrum of the frequency sweep;

determining that an offset between the seismic source and the infrastructure matches an actual offset; and applying the frequency sweep to the seismic source, wherein the environmental data includes measurements indicative of ground motion affecting the infrastructure, the ground motion being generated during the seismic survey by the seismic source.

20. The method of claim 19, wherein the step of calculating comprises:

calculating a library of frequency sweeps for various offsets and various types of infrastructure; and selecting a frequency sweep to be applied based on an actual offset and actual type of infrastructure.

* * * * *